US011709082B2

(12) United States Patent
Tokura (10) Patent No.: US 11,709,082 B2
(45) Date of Patent: Jul. 25, 2023

(54) FLUID MEASUREMENT APPARATUS

(71) Applicant: Nippon Telegraph and Telephone Corporation, Tokyo (JP)

(72) Inventor: Akio Tokura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 28 days.

(21) Appl. No.: 17/620,505

(22) PCT Filed: Jun. 24, 2019

(86) PCT No.: PCT/JP2019/024942
§ 371 (c)(1),
(2) Date: Dec. 17, 2021

(87) PCT Pub. No.: WO2020/261331
PCT Pub. Date: Dec. 30, 2020

(65) Prior Publication Data
US 2022/0268608 A1    Aug. 25, 2022

(51) Int. Cl.
*G01F 1/661*    (2022.01)
(52) U.S. Cl.
CPC ................... *G01F 1/661* (2013.01)
(58) Field of Classification Search
CPC .......................................... G01F 1/661
USPC ........................................ 73/272 R
See application file for complete search history.

(56) References Cited

U.S. PATENT DOCUMENTS

2007/0044572 A1* 3/2007 Davis .................. G01F 1/86
73/861.42

FOREIGN PATENT DOCUMENTS

JP         S5759173 A       4/1982
JP         2018009923 A  *  1/2018

OTHER PUBLICATIONS

Translation of JP-2018009923-A (Year: 2018).*
Jayanthy, A.K. et al., "Measuring Blood Flow: Techniques and Applications—A Review," IJRRAS, vol. 6, No. 2, Feb. 2011, 14 pages.
Pruijmboom, A. et al., "VCSEL-Based Miniature Laser-Doppler Interferometer," Proc. of SPIE, vol. 6908, 2008, 7 pages.

* cited by examiner

*Primary Examiner* — Nathaniel T Woodward
(74) *Attorney, Agent, or Firm* — Slater Matsil, LLP (57) ABSTRACT

A fluid measurement device includes sensor elements that are arranged around a pipe in which a fluid containing a scatterer flows and include each of a light source, a light receiver, and a partition structure for shading between the light source and the light receiver, a signal processor that processes the signals obtained from the light that has been received and photoelectrically converted by the light receivers, and a calculator that calculates at least one of a flow velocity and a flow rate using the signals processed by the signal process unit. The light source and the light receiver in each of the sensor elements are arranged in proximity along the pipe axis direction of the pipe so as to have a reverse positional relationship to the light source and the light receiver in the adjacent sensor elements.

10 Claims, 9 Drawing Sheets

FLUID MEASUREMENT APPARATUS

This patent application is a national phase filing under section 371 of PCT/JP2019/024942, filed on Jun. 24, 2019, which application is hereby incorporated herein by reference.

TECHNICAL FIELD

Embodiments of the present invention relate to a fluid measurement device, particularly a fluid measurement device that measures a flow rate, a flow velocity, or the like of a fluid flowing in a flow path using coherent light.

BACKGROUND

Technologies for measuring a flow rate and a flow velocity of a fluid flowing in a flow path are widely used in the industrial and medical fields. There are various types of fluid measurement devices for measuring the flow rate and the flow velocity, such as an electromagnetic flowmeter, a vortex flowmeter, a Coriolis flowmeter, an ultrasonic flowmeter, and a laser flowmeter, and the devices are properly used depending on their applications. Among these devices, since the laser flowmeter and the ultrasonic flowmeter are capable of measuring the flow rate and the flow velocity in a non-contacting manner, without contact with the fluid flowing in the flow path, they are used for applications in which hygiene is required or any flowmeter cannot be inserted into an existing flow path, for example.

Although the ultrasonic flowmeter is widely used due to its high accuracy, there is a problem that the cost is inevitably high to reduce the size. In this respect, the laser flowmeter is easy to reduce the size and can be manufactured as a small flowmeter at a low cost.

The laser flowmeter includes a laser Doppler flowmeter (see, for example, Patent Literature 1, Non-Patent Literature 1, and Non-Patent Literature 2). The laser Doppler flowmeter irradiates a flow path with laser light, which is coherent light of one light flux or two light fluxes. When a scatterer contained in the fluid in the flow path and having a velocity passes through a region irradiated with the laser light, the laser light is scattered, and the frequency of the scattered light is subjected to the Doppler shift. On the other hand, the frequency of the scattered light from a stationary object, such as a wall of the flow path, is not subject to the Doppler shift.

When the scattered light subjected to the Doppler shift and the scattered light not subject to the Doppler shift are simultaneously received by a photodiode or the like and converted into an electric signal, heterodyne detection is performed, and a beat signal is observed. Calculating the frequency spectrum of the observed beat signal and extracting the peak frequency can give the moving velocity of the scatterer. When the flow is laminar, the average flow velocity and the average flow rate of the fluid flowing in the flow path are proportional to the moving velocity of the scatterer obtained by the above manner, and then the calibration, in which the moving velocity is multiplied by a constant of proportionality in accordance with the flow path, can give the average flow velocity and the average flow rate of the fluid.

Figure 8:
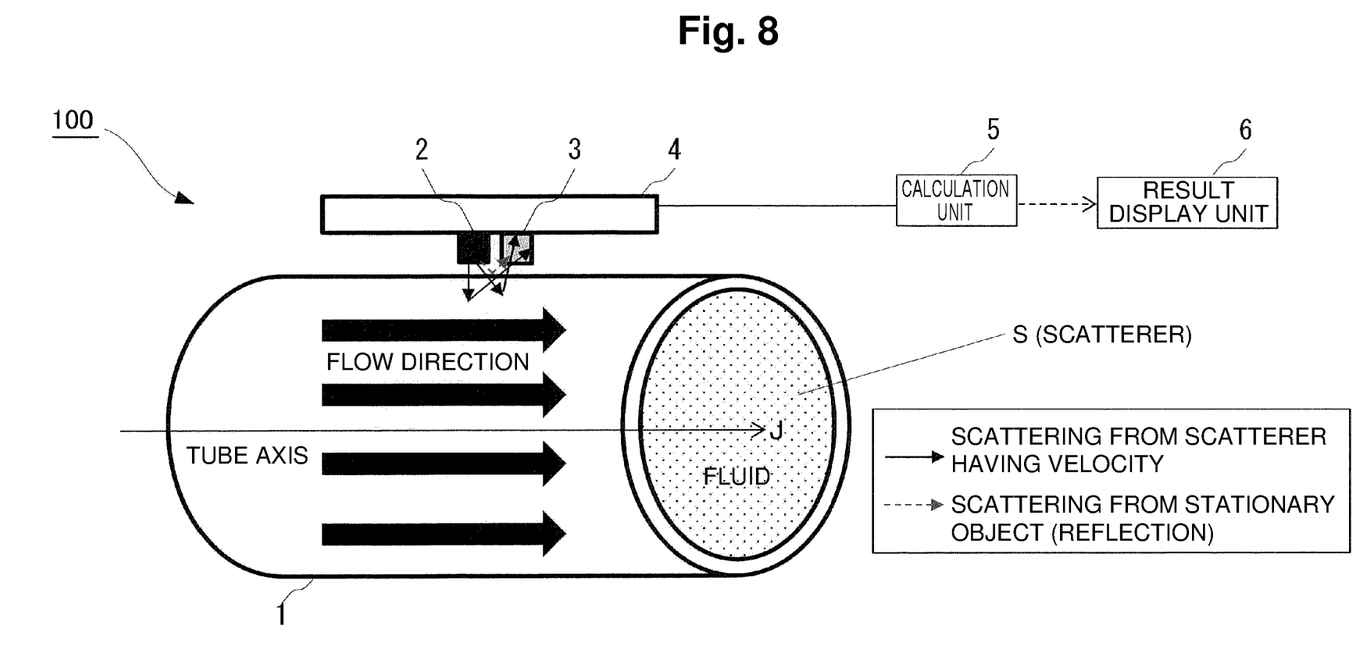
FIG. 8 is a diagram illustrating a configuration of a conventional fluid measurement device (a laser Doppler flowmeter).

The configuration of a conventional laser Doppler flowmeter is now described with reference to FIG. 8. FIG. 8 illustrates a laser Doppler flowmeter 100 for measuring a flow rate of a pipe 1 (hereinafter, also referred to as a tube) in which a fluid flows, and the pipe 1 is made of a material having transparency to light-source light (light from a light source unit). When the light-source light is, for example, visible light to near-infrared light, the pipe 1 is made of, for example, vinyl chloride, and the cross section perpendicular to the flow path direction is circular, for example. The fluid contains a plurality of scatterers S.

The laser Doppler flowmeter 100 is composed of a light source unit 2, a light reception unit 3, a signal process unit 4 that performs a primary process such as amplification and filtering of a light reception signal, and a calculation unit 5 that performs a calculation process based on the signal. The calculation result is sent to a result display unit 6 that is configured to display the final measurement result and includes a personal computer (PC), a display monitor, or the like.

The light source unit 2 includes, for example, a semiconductor laser element (LD) such as a surface emitting laser and is arranged around the pipe 1 to irradiate the fluid with laser light. The light reception unit 3 is composed of, for example, a photodiode element (PD), and receives scattered light from the scatterers S in the fluid or scattered light from a stationary object such as a pipe wall to perform photoelectric conversion.

The light source unit 2 and the light reception unit 3 may be mounted in proximity on one substrate or may be composed of separate substrates. In the conventional method, the light source unit 2 and the light reception unit 3 are generally often located in proximity to miniaturize the sensor. In this example, the light source unit 2 and the light reception unit 3 are mounted in proximity on a printed circuit board, which is the signal process unit.

CITATION LIST

Patent Literature

Patent Literature 1: Japanese Patent Laid-Open No. 57-059173

Non-Patent Literature

Non-Patent Literature 1: A. K. Jayanthy, et. al., "MEASURING BLOOD FLOW: TECHNIQUES AND APPLICATIONS—A REVIEW", International Journal of Recent Research and Applied Studies, 6 (2011) pp. 203-216.

Non-Patent Literature 2: Armand Pruijmboom, et. al., "VCSEL-based miniature laser-Doppler interferometer", Proc. of SPIE, Vol. 6908 (2008) pp. 69080I-1-69080I-7.

SUMMARY

Technical Problem

However, in the laser Doppler flowmeter 100, since the pipe 1 has elasticity, the flow path is easily bent. A bend in the flow path or the like causes a bias in the flow velocity distribution. Such situations are schematically illustrated in FIGS. 9A and 9B.

Figure 9A:
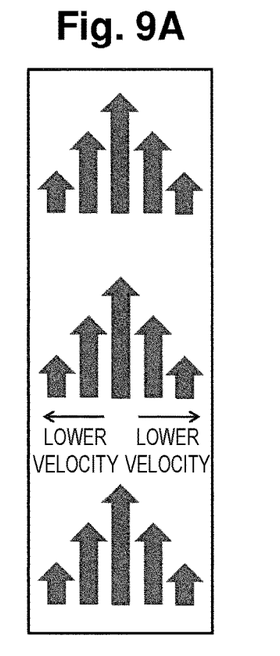
FIG. 9A is a diagram illustrating a velocity distribution of a straight pipe having no bend in a flow path.

FIG. 9A is a diagram illustrating a velocity distribution of a straight pipe having no bend in the flow path. The flow in the straight pipe has a uniform velocity distribution called a laminar flow under a condition that the Reynolds number is less than or equal to a certain value. The velocity is low near the pipe wall susceptible to viscosity, while the velocity is high in the center of the pipe, and such distribution occurs at any position in the pipe. As a result, the average flow velocity and the average flow rate of the fluid flowing in the flow path are proportional to the detected moving velocity of the scatterer, as described above. Therefore, the calibration, in which the moving velocity is multiplied by a constant of proportionality in accordance with the flow path, can give the average flow velocity and average flow rate of the fluid.

Figure 9B:
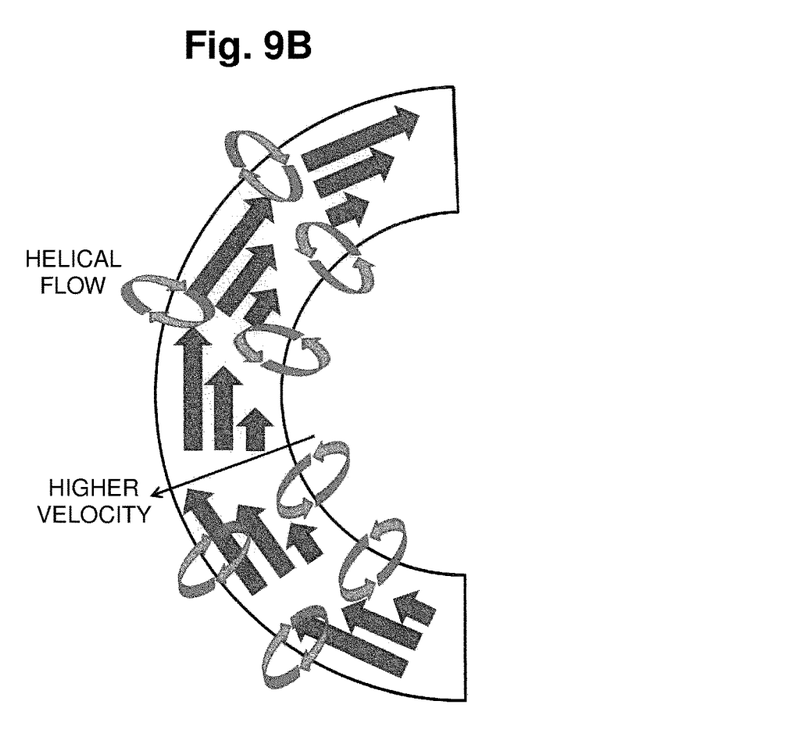
FIG. 9B is a diagram illustrating a velocity distribution of a pipe having a bend in a flow path.

On the other hand, FIG. 9B is a diagram illustrating a velocity distribution of a pipe having a bend in the flow path. In this case, the distribution is different from the laminar flow state observed in the straight pipe due to the effect of the bend. Specifically, the centrifugal force caused by the bending shape and the velocity of the fluid biases components having higher velocities further toward the outside of the bend (the side having a small curvature). Furthermore, the pressure gradient due to the centrifugal force generates a flow in the direction perpendicular to the pipe axis, that is, in the radial direction. The composition of these flow components gives a velocity distribution involving a helix to the fluid in the pipe having the bend, and the distribution is not uniform. In addition, when the curvature of the pipe fluctuates with the position, a velocity distribution complicatedly involving the above-mentioned effects is generated. Since the detected moving velocity of the scatterer is a moving velocity in a local region, the moving velocity reflects the bias of the flow velocity distribution and largely fluctuates depending on the measurement position. Therefore, it is very difficult to determine the average flow velocity and the average flow rate of the fluid from the moving velocity.

Embodiments of the present invention can solve such problems, and an object of embodiments of the present invention is to provide a fluid measurement device capable of more accurately measuring an average flow velocity and an average flow rate of a fluid that contains a scatterer flowing in a pipe composed of an elastic body.

Means for Solving the Problem

To solve the above-mentioned problems, a fluid measurement device of embodiments of the present invention includes: first to 2Nth (a number N is an integer of 2 or more) sensor elements that are arranged around a pipe in which a fluid containing a scatterer flows and include each of a light source unit irradiating the fluid with coherent light, a light reception unit receiving and photoelectrically converting the coherent light, and a partition structure for shading between the light source unit and the light reception unit; a signal process unit that performs amplification and filtering of signals obtained from the coherent light that has been received and photoelectrically converted by the light reception units of the first to 2Nth sensor elements; and a calculation unit that converts the signals processed by the signal process unit into digital signals and calculates at least one of a flow velocity and a flow rate of the fluid based on the digital signals, wherein: the light source unit and the light reception unit in each of the first to 2Nth sensor elements are arranged in proximity along a pipe axis direction of the pipe so as to have a reverse positional relationship to the light source unit and the light reception unit in the adjacent sensor element; the first to 2Nth sensor elements are arranged on a plane perpendicular to a pipe axis of the pipe at generally equal angular intervals; the coherent light that has been emitted from the light source unit of any one sensor element of the first to 2Nth sensor elements and has passed through the fluid flowing in the pipe is received by the light reception unit of the sensor element adjacent to the one sensor element; and a distance between the one sensor element and the sensor element adjacent thereto is $\pi d/2$ or more and $\sqrt{2}r$ or less, where d is a distance between the light source unit and the light reception unit in the one sensor element and r is an outer radius of the pipe.

Effects of Embodiments of the Invention

As described above, according to embodiments of the present invention, it is possible to provide a fluid measurement device capable of more accurately measuring an average flow velocity and an average flow rate of a fluid that contains a scatterer flowing in a pipe composed of an elastic body.

DETAILED DESCRIPTION OF ILLUSTRATIVE EMBODIMENTS

Embodiments of the present invention will be described in detail with reference to the accompanying drawings below. An outline of embodiments of the present invention is described before the embodiments are described.

Outline of Embodiments of the Invention

As described above, when a pipe is composed of an elastic body or the like and a bend may occur in the tube, it is very difficult to obtain the average flow velocity and the average flow rate of a fluid from the moving velocity. The reason is that the detected information on the velocity of a scatterer is that in a local region.

Therefore, in a situation where the velocity distribution varies depending on the position in the pipe, that is, the velocity distribution is not uniform, the detected value fluctuates due to the sensor's position or change in bending condition. One of the methods to solve this problem is to expand the region for obtaining the detected information on the velocity of the scatterer and average the resultant values. For this purpose, it is necessary to increase the distance between the light source unit and the light reception unit so that the scattered light occurring from a wider region can be received.

However, since the intensity of the scattered light is low, simply increasing the distance between the light source unit and the light reception unit leads to diffusion of the light during repeated multiple scattering, and the intensity of the light may become low enough to be difficult to be detected. For a light-absorbing medium, the scattered light is attenuated due to the absorption.

To solve the problem, it is necessary to detect the scattered light in a direction involving a higher scattering intensity. In other words, when the distance between the light source unit and the light reception unit is short as with the prior art, the light from the light source unit scattered in the back of the scatterer (hereinafter, referred to as "back-scattered light") is inevitably received, but instead, for the fluid measurement device according to the present embodiment, the light from the light source unit scattered in the front of the scatterer (hereinafter, referred to as "forward-scattered light") is received to solve the problem. Since the "forward-scattered light" travels in an optical path that transmits across (passes) the fluid, the "transmitted light" described below contains the forward-scattered light.

For blood, which is often measured with flowmeters, the size (particle size) of the erythrocyte, which is a scatterer, is similar to the wavelength used for measurement, and the scattering in such a case is called "Mie scattering". For the scattering of this type, since the forward-scattered light has an intensity about 10 times higher than that of the back-scattered light, the light attenuation due to an increase in the distance between the light source unit and the light reception unit can be compensated by receiving the forward-scattered light.

Therefore, the light source unit and the light reception unit may be located in the "transmitted light detection arrangement", in which the transmitted light from the light source is received, to selectively detect the forward-scattered light. The transmitted light here means the light containing the forward-scattered light and having transmitted through the fluid flowing in the pipe. Further, this arrangement allows the transmitted light to be detected and thus has an effect that the information on the concentration of the scatterer can be obtained from the attenuation amount of the transmitted light due to absorption and scattering by the scatterer.

The light source unit and the light reception unit may be arranged as separate elements. However, arranging a plurality of sensor elements, each having the light source unit and the light reception unit provided in proximity on one substrate (hereinafter, also referred to as an "integrated sensor element"), around the pipe is more advantageous to improve the measurement accuracy, because data at various positions can be obtained and the number of data increases.

When the light source unit and the light reception unit are arranged in the "transmitted light detection arrangement", the distance between the light source unit and the light reception unit is an important factor. The longer optical path facilitates receiving the scattered light occurring from a wider region, which may enhance the averaging effect of the velocity distribution. However, although the intensity of the forward-scattered light is high, the longer the optical path, i.e., the transmission distance, is, the more easily the forward-scattered light suffers diffusion attenuation and absorption attenuation due to multiple scattering, which leads to a decrease in the intensity of the light reception signal.

As a verification to confirm the intensity of the light reception signal and the averaging effect, four sensors, each provided with a light source unit and a light reception unit, are placed around a pipe at generally equal angular intervals (every 90°), for example, and consequently, it has been first experimentally verified that, as compared to when the light source unit and the light reception unit are placed on a line across the diameter of the pipe to measure the diluted fluid and four sensor signals are averaged, when the transmitted light is received by the adjacent sensor (adjacent sensor arrangement) to measure the fluid and four sensor signals are averaged, the effect of the bend of the pipe is reduced. Hereinafter, such an arrangement is referred to as the "complete transmission arrangement".

According to such verification, it has been confirmed that, to effectively reduce the effect of the bend of the pipe, the distance between the light source unit and the light reception unit in measurement should be shorter than that in the complete transmission arrangement, and that the optimum number of sensor elements is 3 or more when a plurality of integrated sensors is used.

Although the sensor element receives, at the light reception unit, the scattered light subjected to the Doppler shift, it also receives the reflected light not subjected to the Doppler shift from a stationary object. A high-frequency signal proportional to the velocity of the scatterer is generated due to the interference effect of the light subjected to the Doppler shift and the light not subjected to the Doppler shift, and when the reflected light is too strong, a problem occurs.

Figure 1A:
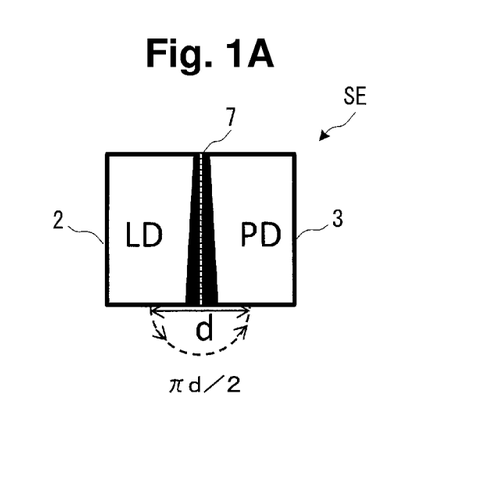
FIG. 1A is a diagram illustrating an exemplary configuration of a sensor element in a fluid measurement device.

The reflected light is 100 to 1000 times stronger than the scattered light subjected to the Doppler shift. Therefore, when the weak scattered light is measured with high sensitivity, the measurement may be unsuccessful due to saturation of the light reception signal upon receiving the reflected light. Even when the light reception signal is not saturated, a large photoexcitation current caused by receiving the strong reflected light increases shot noise and reduces the S/N of the signal. Accordingly, as illustrated in FIG. 1A, a partition structure 7 for shading is often provided between a light source unit 2 and a light reception unit 3 so that the reflected light from a stationary object close to the sensor does not directly reach the light reception element. The partition structure 7 is made of a material that does not transmit the reflected light from the light source unit 2, and thus it is possible to avoid a decrease in S/N due to the saturation of the light reception signal or the large shot noise described above.

Figure 1B:
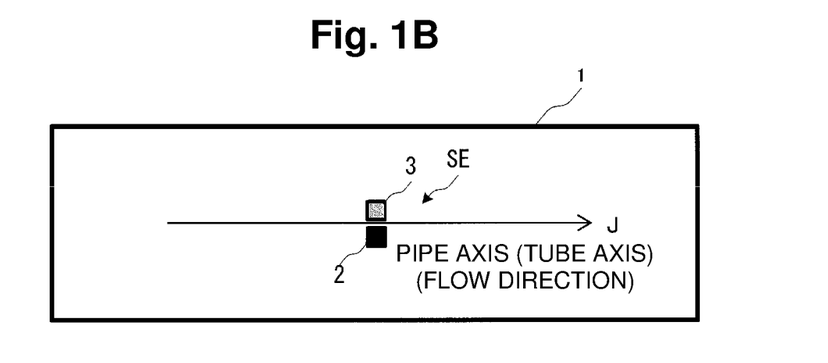
FIG. 1B is a diagram illustrating an exemplary arrangement of a light source unit and a light reception unit that are aligned perpendicular to the pipe axis.
Figure 2A:
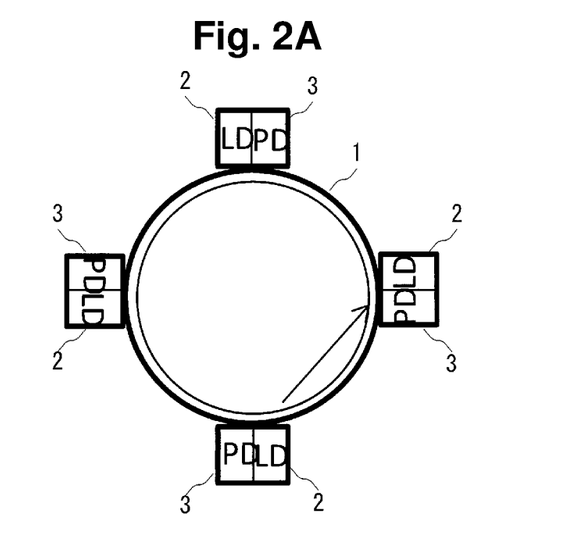
FIG. 2A is a diagram illustrating that when the light source units and the light reception units are aligned perpendicular to the pipe axis, the light reception intensity differs depending on the positions of the elements.
Figure 2B:
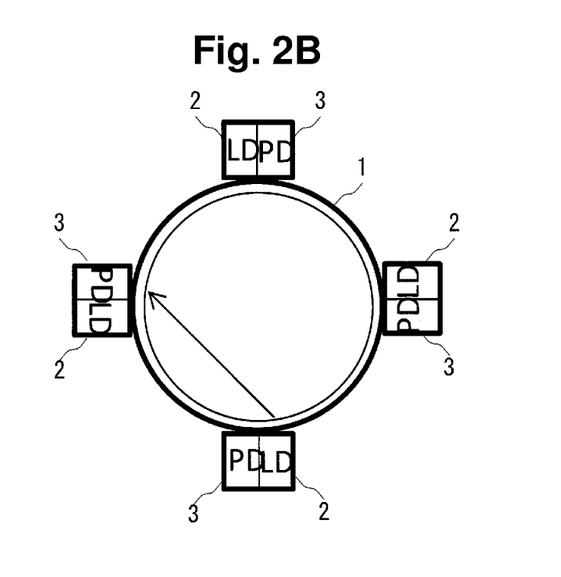
FIG. 2B is a diagram illustrating that when the light source units and the light reception units are aligned perpendicular to the pipe axis, the light reception intensity differs depending on the positions of the elements.

However, for the sensor element having this partition structure, if the light source unit 2 and the light reception unit 3 are aligned in the direction orthogonal to the flow direction of the fluid, that is, perpendicular to the pipe axis, as illustrated in FIG. 1B, the light reception intensity may decrease when the transmitted light from the light source unit 2 of any one sensor element is received by the light reception unit 3 of the adjacent sensor element, or conversely, when the light reception unit 3 of any one sensor element receives the transmitted light from the light source unit 2 of the adjacent sensor element. For example, although the light can be received in the adjacent arrangement (FIG. 2A) in which the light source unit 2 and the light reception unit 3 are close to each other, the light reception intensity extremely decreases in the arrangement in which the light source unit 2 and the light reception unit 3 are spaced (FIG. 2B).

Figure 1C:
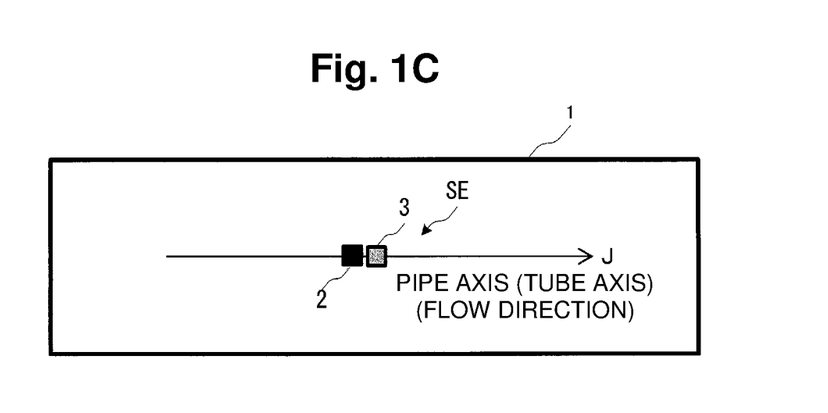
FIG. 1C is a diagram illustrating an exemplary arrangement of a light source unit and a light reception unit aligned parallel to the pipe axis.

Therefore, when such sensor elements are used, an additional contrivance is required. As a contrivance for this purpose, as illustrated in FIG. 1C, the light source unit 2 and the light reception unit 3 are aligned along the pipe axis (tube axis), that is, parallel to the flow direction of the fluid, and the light source units 2 and the light reception units 3 are reversely arranged in respective adjacent sensor elements, which allows the light to be efficiently received. In order for this arrangement to hold for every sensor element, the number of sensors needs to be 2N (N: integer).

The optimum number of sensor elements in the transmitted light reception arrangement is 3 or more as described above, and thus it is 4 or more in this configuration. Therefore, it has been appreciated that the distance between any one sensor element and the sensor element adjacent thereto is desirably less than or equal to $L_{90°}$, which is a distance between adjacent sensor elements when four integrated sensor elements are arranged at generally equal angular intervals. In this case, the distance $L_{90°}$ between the adjacent sensor elements is $\sqrt{2}r$, in which r is the outer radius of the pipe (the radius for the outer diameter).

Embodiments of the present invention are more effective than the conventional method, in which the back-scattered light is received using the light source unit 2 and the light reception unit 3 of the integrated sensor, when the optical path length in measurement is larger and the averaging effect of the velocity distribution is then larger. Assuming that the distance between the light source unit 2 and the light reception unit 3 in the integrated sensor is d, the average optical path length of the conventional type for receiving the back-scattered light is estimated to be the arc length $\pi d/2$, as illustrated in FIG. 1A. Therefore, the optimum distance between the light source unit and the light reception unit in measurement is $\pi d/2$ or more, which has been confirmed by verification.

Accordingly, setting the distance between the sensor elements to $\pi d/2$ or more, although a little fluctuation is caused by the arrangement relationship between the light source unit 2 and the light reception unit 3 inside the sensor element, achieves the optical path length for which embodiments of the present invention are effective regardless of the details of the arrangement relationship between the light source unit 2 and the light reception unit 3. Therefore, when a plurality of integrated sensor elements are used, the distance between the sensor element emitting the coherent light and the sensor element receiving the coherent light is desirably $\pi d/2$ or more and $\sqrt{2}r$ or less.

When the integrated sensor elements are used, the back-scattered light can be received using the light reception unit in the same element, and thus the light reception signal of the back-scattered light may be additionally used to calculate the flow rate and the flow velocity.

In measurement, to easily perform processing such as normalization of the light amounts, each light reception unit desirably receives the light from one light source unit at a time. In other words, it is desirable for each light reception unit not to simultaneously receive the light from two light source units. For this reason, a contrivance such as shifting the output times of the light source units is desirable, but if the measurement accuracy is not adversely affected, the light from a plurality of light source units may be simultaneously received.

First Embodiment

Figure 3:
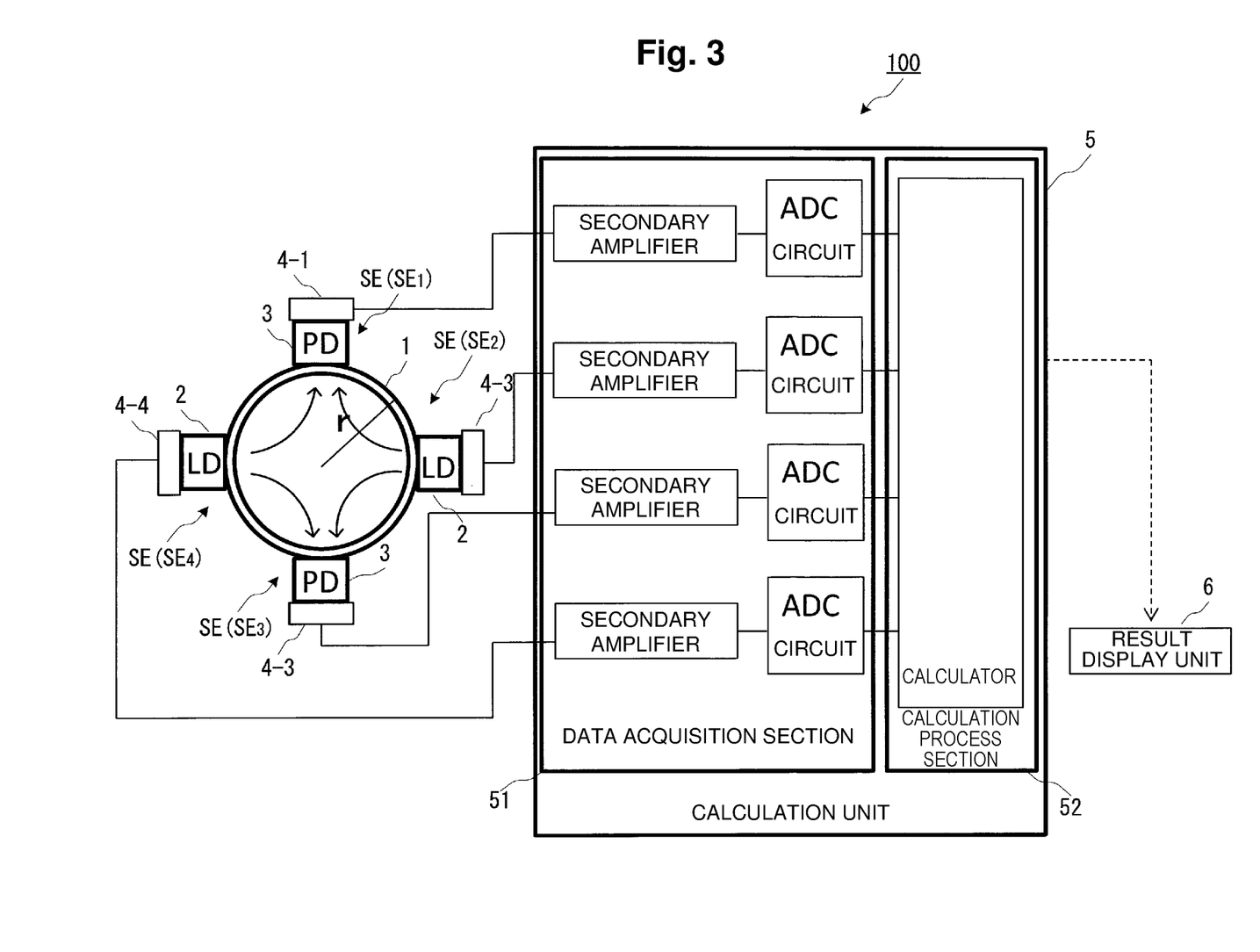
FIG. 3 is a diagram illustrating a configuration of a fluid measurement device according to a first embodiment of the present invention.
Figure 4A:
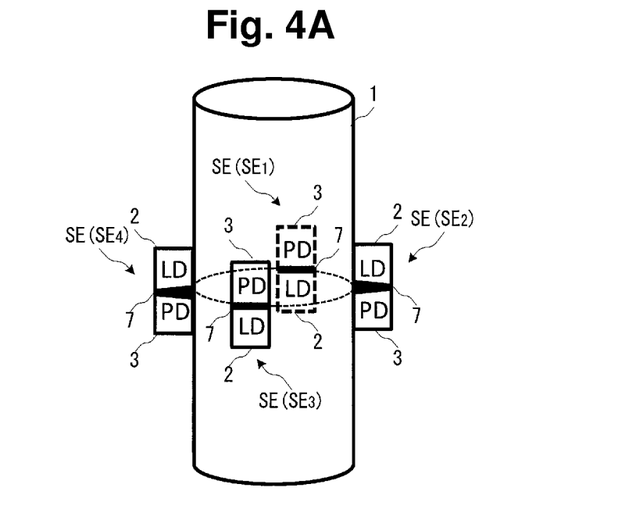
FIG. 4A is a diagram illustrating an arrangement (a side view) of light source units and light reception units according to the first embodiment of the present invention.

A fluid measurement device according to a first embodiment of the present invention is described with reference to the accompanying drawings below. FIG. 3 illustrates an exemplary configuration of a fluid measurement device 100 according to the first embodiment. In the present embodiment, a light source unit 2 and a light reception unit 3 in each sensor element SE ($SE_1$ to $SE_4$) are arranged in proximity along the pipe axis direction of a pipe as illustrated in FIG. 4A.

In the present embodiment, for example, a vinyl chloride pipe having an outer diameter 2r of 5.6 mm is used as a pipe 1, and four integrated sensor elements SE each provided with the light source unit 2 and the light reception unit 3 in proximity on one substrate are arranged around the pipe on a plane perpendicular to the pipe axis of the pipe at generally equal angular intervals (90° intervals). In this case, the distance between the light source unit and the light reception unit of the adjacent sensor elements SE is equal for the four sensor elements SE.

Figure 4B:
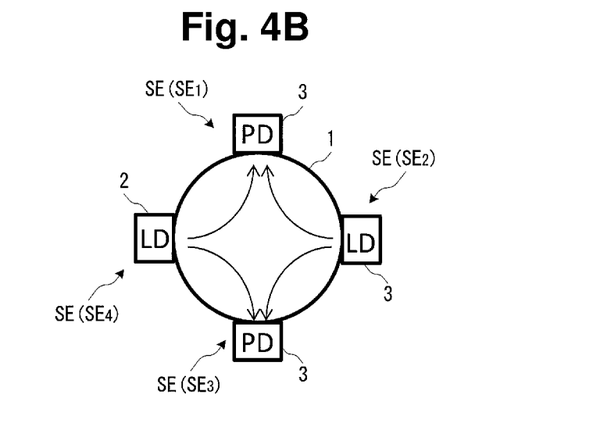
FIG. 4B is a diagram illustrating an arrangement (a top view) of the light source units and the light reception units according to the first embodiment of the present invention.
Figure 4C:
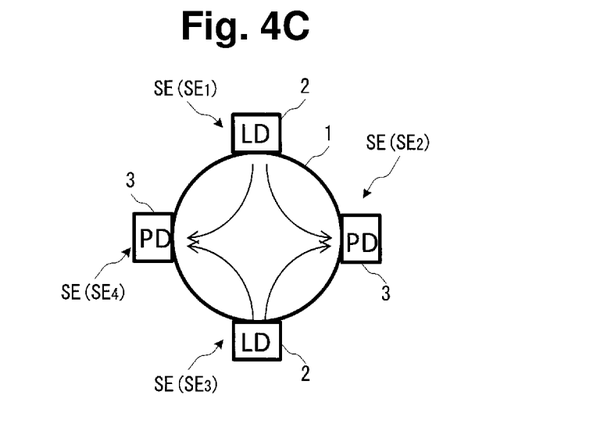
FIG. 4C is a diagram illustrating an arrangement (a bottom view) of the light source units and the light reception units according to the first embodiment of the present invention.

In the present embodiment, as illustrated in FIGS. 4B and 4C, the sensor elements $SE_1$ to $SE_4$ are arranged so that the light emitted from the light source unit of the sensor element $SE_1$ and transmitted through the fluid flowing in the pipe is received by the light reception units of the sensor elements $SE_2$ and $SE_4$. The sensor elements $SE_1$ to $SE_4$ are also arranged so that the light emitted from the light source unit of the sensor element $SE_2$ and transmitted through the fluid flowing in the pipe is received by the light reception units of the sensor elements $SE_3$ and $SE_1$. The sensor elements $SE_1$ to $SE_4$ are also arranged so that the light emitted from the light source unit of the sensor element $SE_3$ and transmitted through the fluid flowing in the pipe is received by the light reception units of the sensor elements $SE_4$ and $SE_2$. The sensor elements $SE_1$ to $SE_4$ are also arranged so that the light emitted from the light source unit of the sensor element $SE_4$ and transmitted through the fluid flowing in the pipe is received by the light reception units of the sensor elements $SE_1$ and $SE_3$.

On the light source unit 2, a surface emitting laser element (LD) for the near-infrared region is mounted as a light source. In this case, although a stable laser element with slight output fluctuation is desirably used as a light source, the output of the laser element may be monitored and corrected. In addition, a photodiode element (PD) is provided adjacent to the light source unit 2 at a distance of about 1 to 2 mm therefrom as a light reception unit 3, and the light source unit 2 and the light reception unit 3 constitute the integrated sensor element SE.

Figure 5:
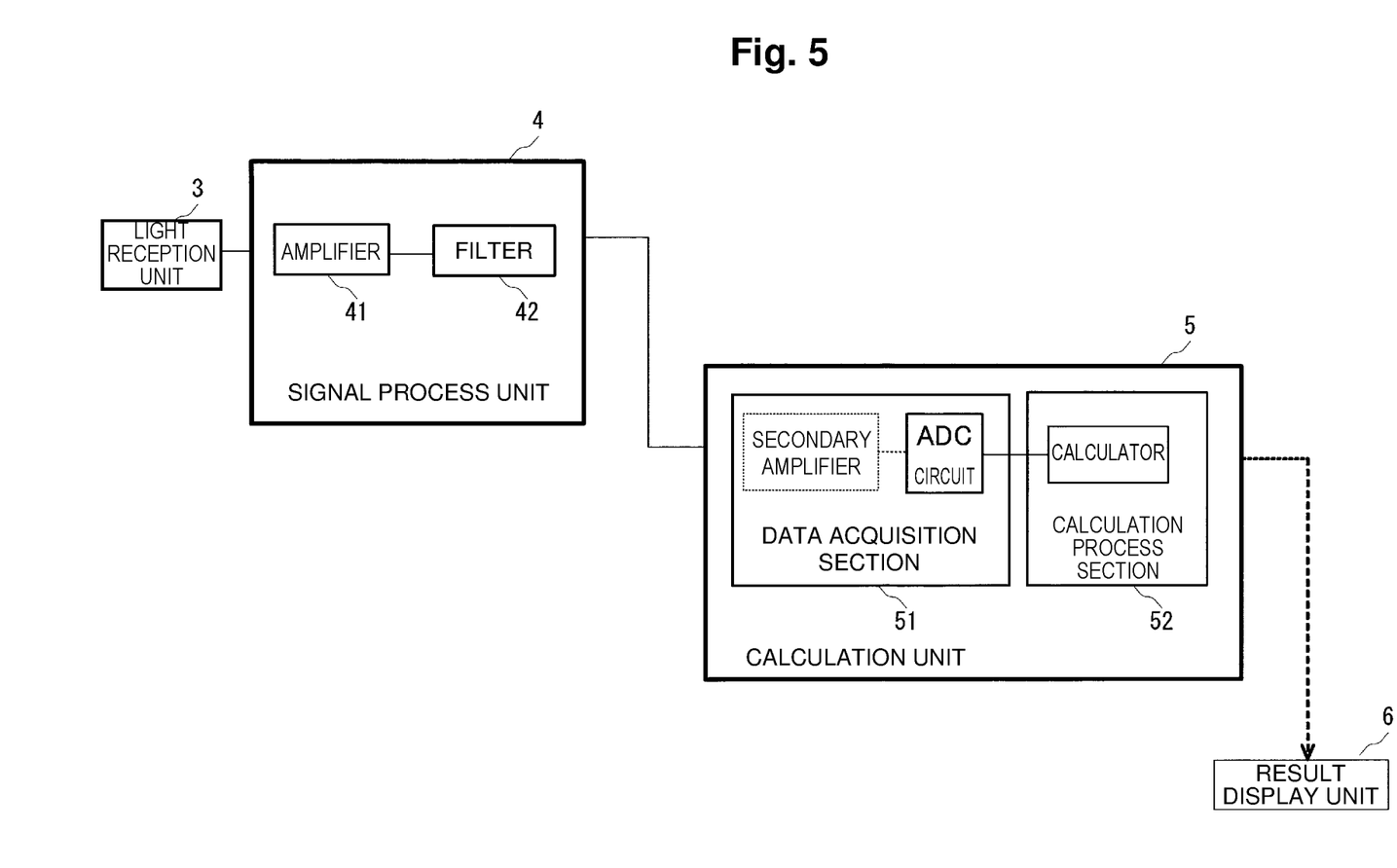
FIG. 5 is a functional block diagram of a signal process unit and a calculation unit.

The sensor element SE mounted on a printed circuit board is referred to as a sensor head. A calculation unit 5 is located downstream from signal process units (4-1 to 4-4) provided for the sensor elements $SE_1$ to $SE_4$. The sensor elements SE are mounted on the printed circuit board including the signal process unit 4. The functional block diagram of the signal process unit 4 and the calculation unit 5 is illustrated in FIG. 5. The signal process unit 4 includes an amplifier 41, such as a transimpedance amplifier, that amplifies a weak current signal from the light reception unit 3 and converts it into a voltage signal, and a filter 42, such as a low-pass filter and a high-pass filter, that extracts a desired band. The calculation unit 5 includes a data acquisition section 51 such as an analog-digital conversion circuit (ADC circuit) and a calculation process section 52 that performs a fast Fourier transform (FFT) or the like using a calculator or the like. The data acquisition section 51 may include a secondary amplifier or filters before the ADC circuit.

The component arrangement in the signal process unit 4 can include eliminations or changes as appropriate according to the measurement situation, for example, the filter 42 in the signal process unit 4 may be relocated to the calculation unit 5. In addition, the signal process units (4-1 to 4-4) may be provided upstream from the calculation unit 5 in the form of one signal process unit, for example.

In the fluid measurement device 100, the light emitted from the light source unit 2 of any one sensor element SE is received by the light reception unit 3 of the adjacent sensor element SE. For example, the light source unit 2 of the sensor element $SE_1$ irradiates the fluid flowing in the pipe 1, which serves as a flow path, with the light-source light having coherence (coherent light). The fluid contains a scatterer S that scatters the light-source light. Vinyl chloride is transparent and has transparency to the wavelength of the light-source light. When scattered by the scatterer S, the light-source light is partially received by the light reception unit 3 of the sensor element $SE_2$. When the concentration of the scatterer S is low, the scattering is mostly single scattering, but as the concentration increases, the light-source light is scattered more than once before reaching the light reception unit 3 of the sensor element $SE_2$. The transmitted light that has not been scattered and the reflected/scattered light from the stationary pipe wall are also received.

The light received by the light reception unit of the sensor element $SE_2$ is converted into an electric signal, and a beat signal is then generated from the light with a change in the wavelength due to the Doppler shift and the light with no change (or very small change) in the wavelength. The beat signal is detected as an alternating-current component. Since the electric signal outputted by the light reception unit of the sensor element $SE_2$ is usually weak and the output current is on the order of A, the electric signal is amplified with the amplifier 41, such as a transimpedance amplifier, arranged in the signal process unit 4 and is converted into a voltage signal at a level that is easy to be handled, for example, about 1 V. The amplified signal is then branched, and one of the branched signals is passed through a high-pass filter to extract only the high-frequency (alternating current) components. As the cutoff frequency of the high-pass filter, an appropriate value of the order of 1 to 100 Hz can be selected.

The other signal that is not passed through the filter is converted into a digital signal by the ADC circuit in the data acquisition section of the subsequent calculation unit 5, and then the high-frequency components are averaged by taking a time average and extracted as a direct current component to use for the normalization of signals, or the like. Since this direct current component changes depending on the transmittance of the liquid, that is, the concentration of the scatterer S in the liquid, the change in the direct current component obtained by removing the fluctuation in the output of the laser element gives information on the concentration of the scatterer S. Therefore, the correspondence among the concentration of the object to be measured, the direct current component, and the flow velocity correlation characteristic quantity described below is determined in advance for the tube to be used and a calibration table is created, and thereby the concentration of the scatterer S may be corrected with respect to the flow velocity correlation characteristic quantity using the direct current component obtained by subtracting the fluctuation in the output of the laser element.

Since the high-frequency component is usually about 1 to 2 orders of magnitude smaller than the direct current component, it is amplified by a secondary amplifier to a value more suitable for signal processing, is then passed through a low-pass filter to remove the high-frequency component not required for the signal processing, and is sent to the calculation unit 5. The cutoff frequency of the low-pass filter varies with the flow velocity of the scatterer S, although it may be 20 MHz, for example.

The calculation unit 5 converts the high-frequency component from the signal process unit 4 into a digital signal with the ADC circuit in the data acquisition section 51. The high-frequency component converted into the digital signal is sent to the calculation process section 52. The calculation process section 52 performs a Fourier transform with FFT and calculates the power to obtain a power spectrum. Once the power spectrum is obtained, the sum of products of the powers P and the frequencies f is calculated over a predetermined frequency range (index i) according to the following expression (1) to obtain the flow velocity correlation characteristic quantity v.

Expression (1) $v = \Sigma(P(fi) \times fi)$ (1)

The above description has been made on the case where the light from the light source unit 2 of the sensor element $SE_1$ is received by the light reception unit 3 of the adjacent sensor element $SE_2$ through the fluid flowing in the pipe. For example, when the light from the light source unit 2 of the sensor element $SE_2$ is received by the light reception unit 3 of the adjacent sensor element $SE_1$ through the fluid flowing in the pipe, or when the light from the light source unit 2 of the sensor element $SE_2$ is received by the light reception unit 3 of the adjacent sensor element $SE_3$ through the fluid flowing in the pipe, the flow velocity correlation characteristic quantity v can be obtained also.

The calculation process section 52 applies an operation, such as multiplication with a calibration coefficient, to the four or eight flow velocity correlation characteristic quantities v (eight velocity correlation characteristic quantities are used when the number of the light source units outputting the light to be received by the light reception unit at one time is limited to one, for example, by adjusting the output times of the light source units), calculates, for example, an average flow velocity value from the four flow velocity correlation characteristic quantities to which the operation has been applied, and sends the average flow velocity value to a result display unit 6. In this way, the fluid measurement is achieved. When the flow velocity correlation characteristic quantity v is calculated, a correction operation for correcting the frequency characteristics of the amplification/filter circuit may be performed as appropriate. Appropriate design of the ADC and the calculation processing allows a correction operation or the like according to the incident light intensity and the reflection level with a direct current component or the like.

In the present embodiment, the integrated sensor elements SE are arranged around the pipe on a plane perpendicular to the pipe axis of the pipe at generally equal angular intervals, and the light emitted by the light source unit 2 of any one sensor element SE is received by the light reception unit 3 of the adjacent sensor element SE through the fluid flowing in the pipe. Specifically, the scattered light is received using the light reception unit 3 of the adjacent sensor element SE. Consequently, the scattered light can be received from a wider fluid region than previously possible, and the velocity distribution can be averaged over a wider region. In addition, the fluid measurement can be achieved by averaging the light reception signals of a plurality of sensor elements SE.

As a result, the present embodiment makes it possible to reduce the effect of the variation in velocity distribution caused by the bend of the pipe by 14% or more as compared with before. Then, since the transmitted light detection arrangement, in which the forward-scattered light having a high scattering intensity can be selectively received, is employed, the effect of the attenuation of the scattered light due to the greater number of light paths as compared with before is offset and a similar magnitude of the scattered signal to the conventional one can be received.

Figure 6A:
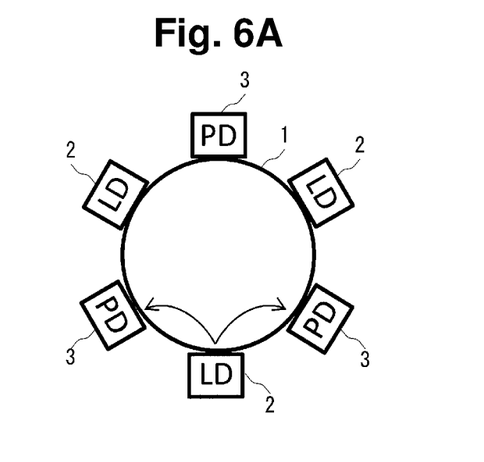
FIG. 6A is a diagram illustrating an example (a top view) in which six sensor elements are arranged around a pipe.
Figure 6B:
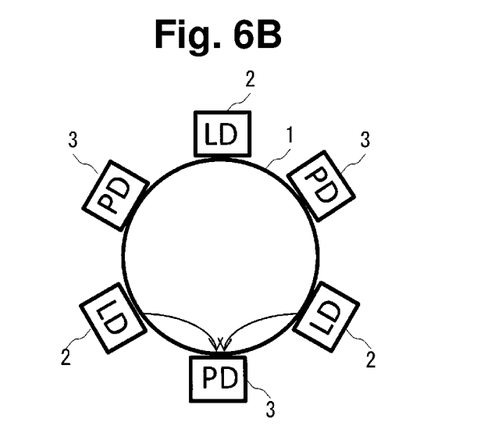
FIG. 6B is a diagram illustrating the example (a bottom view) in which the six sensor elements are arranged around the pipe.
Figure 6C:
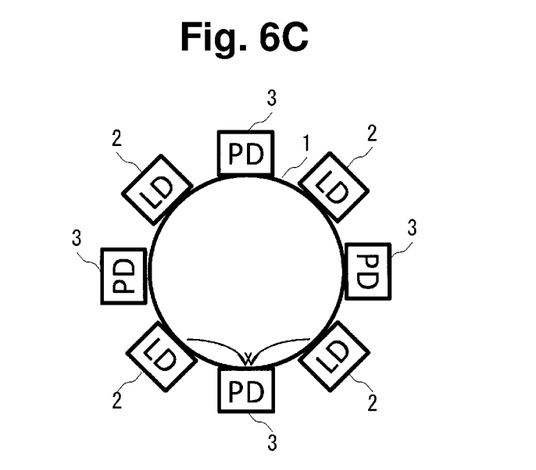
FIG. 6C is a diagram illustrating an example (a top view) in which eight sensor elements are arranged around a pipe.
Figure 6D:
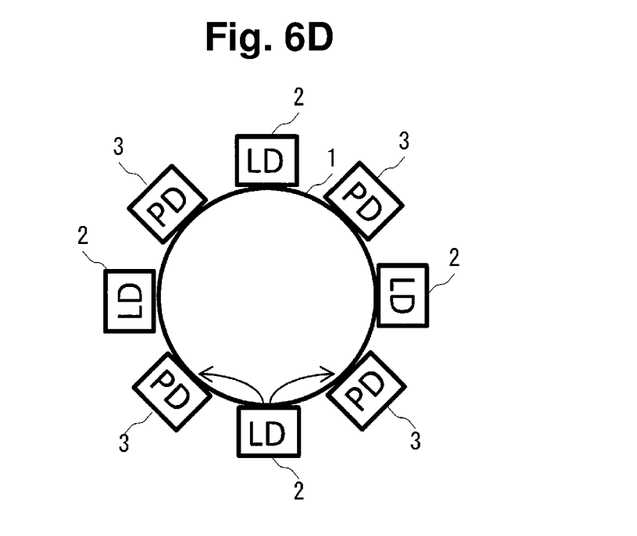
FIG. 6D is a diagram illustrating the example (a bottom view) in which the eight sensor elements are arranged around the pipe.

Although four sensor elements SE are arranged around the pipe at generally equal angular intervals (4 sensors) in the present embodiment, six sensor elements SE may be arranged as illustrated in FIGS. 6A and 6B (6 sensors) or eight sensor elements SE may be arranged as illustrated in FIGS. 6C and 6D (8 sensors). In these cases, it is possible to reduce the effect of the variation in velocity distribution caused by the bend of the pipe by 16% or more for 6 sensors and by 18% or more for 8 sensors as compared with before.

Second Embodiment

Figure 7:
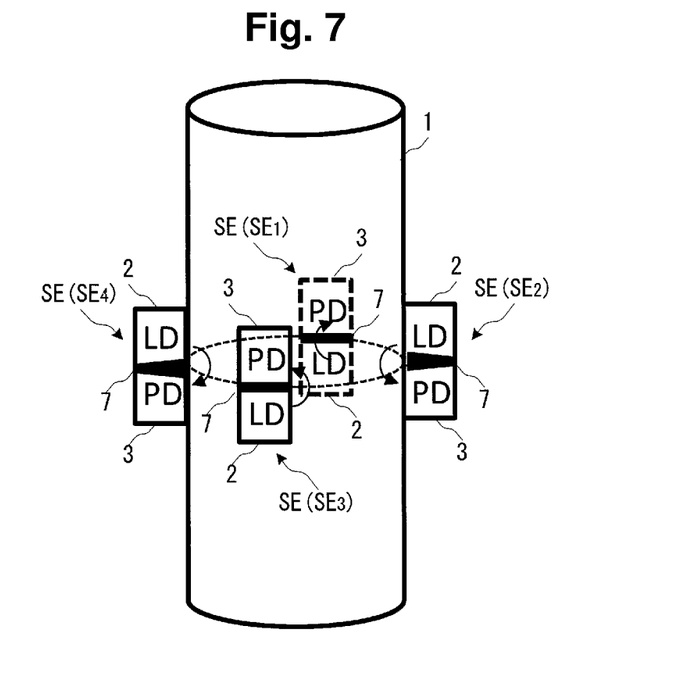
FIG. 7 is a diagram illustrating an arrangement (a side view) of light source units and light reception units according to a second embodiment of the present invention.

In a second embodiment, as illustrated in FIG. 7, four integrated sensor elements SE ($SE_1$ to $SE_4$) are arranged around the pipe at equal angular intervals (90° intervals). In the second embodiment, while the forward-scattered light (transmitted light) is received using the adjacent sensor element, the back-scattered light is received using the light reception unit in the same sensor element SE as the light source unit. The light reception signals of the back-scattered light are also used for averaging to calculate the flow rate or the flow velocity.

In this way, it is possible to reduce the effect of the variation in velocity distribution caused by the bend of the pipe by 18% or more as compared with before.

Third Embodiment

Although a fluid measurement device according to a third embodiment has an arrangement and a measurement configuration similar to those of the first embodiment, attention is paid to an increase or decrease of the direct current component corresponding to the transmitted light in accordance with the concentration of the scatterer S having light absorption characteristics as described above.

Specifically, the correspondence among the concentration of the object to be measured, the direct current component, and the flow velocity correlation characteristic quantity is determined in advance for the tube to be used or the like and a calibration table is created, and then, in the calculation unit, the direct current component obtained by subtracting the fluctuation in the output of the laser element is checked against the calibration table to correct the flow velocity correlation characteristic quantity caused by the variation in the concentration of the scatterer S. Thus, the flow velocity correlation characteristic quantity of the fluid in the pipe independent of the concentration of the scatterer S, for example, the average flow rate, can be measured.

In this way, the third embodiment makes it possible to reduce the effect of the variation in velocity distribution caused by the bend of the pipe by 14% or more as compared with before, as with the first embodiment, and further to reduce the fluctuation in the flow rate value depending on the concentration of scatterer S by 15% or more. Consequently, the reduction effect on fluctuation in the flow rate value can reach 22% or more in total.

Extension of Embodiments

The present invention has been described with reference to the embodiments but is not limited to the above embodiments. Various modifications understandable to those skilled in the art can be made to the configurations and details of the present invention within the scope of the technical ideas of the present invention.

REFERENCE SIGNS LIST

1 pipe
2 light source unit
3 light reception unit
4, 4-1 to 4-4 signal process unit
41 amplifier
42 filter
5 calculation unit
51 data acquisition section
52 calculation process section
6 result display unit
7 partition structure
SE ($SE_1$ to $SE_4$) sensor element
S scatterer
100 fluid measurement device (laser Doppler flowmeter)

The invention claimed is:
1. A fluid measurement device comprising:
first to 2Nth sensor elements, wherein N is an integer of 2 or more, arranged around a pipe in which a fluid containing a scatterer flows, each of the first to 2Nth sensor elements comprising a light source configured to irradiate the fluid with coherent light, a light receiver configured to receive and photoelectrically convert the coherent light, and a partition structure configured to shade between the light source and the light receiver, wherein the light source and the light receiver in each of the first to 2Nth sensor elements are arranged in proximity along a pipe axis direction of the pipe, each of the light sources and the light receivers of the first to 2Nth sensor elements having a reverse positional relationship to the light sources and the light receivers of adjacent sensor elements of the first to 2Nth sensor elements, and wherein the first to 2Nth sensor elements are arranged on a plane perpendicular to a pipe axis of the pipe at generally equal angular intervals;
a signal processor configured to perform amplification and filtering of signals obtained from the coherent light received and photoelectrically converted by the light receivers of the first to 2Nth sensor elements; and a calculator configured to convert the signals amplified and filtered by the signal processor into digital signals and calculate a flow velocity or a flow rate of the fluid based on the digital signals;

wherein the light receiver of a first sensor element of the first to 2Nth sensor elements is configured to receive the coherent light emitted from the light source of a second sensor element of the first to 2Nth sensor elements and passed through the fluid flowing in the pipe, the second sensor element being adjacent to the first sensor element; and wherein a distance between the first sensor element and the second sensor element is πd/2 or more and √2r or less, where d is a distance between the light source and the light receiver in the second sensor element and r is an outer radius of the pipe.

2. The fluid measurement device according to claim 1, wherein the calculator is configured to calculate the flow velocity or the flow rate of the fluid based on the coherent light emitted from the light source of the second sensor element, passed through the fluid flowing in the pipe, and received by the light receiver of the first sensor element, and based on scattered light, due to the scatterer, emitted from the light source of the second sensor element and received by the light receiver of the first sensor element.

3. The fluid measurement device according to claim 1, wherein the calculator is configured to calculate the flow velocity or the flow rate of the fluid based on an average value of signals received by the light receivers of the first to 2Nth sensor elements.

4. The fluid measurement device according to claim 1, wherein the calculator is configured to calculate concentration information on the fluid based on signals of transmitted light detected by the light receivers of the first to 2Nth sensor elements and to correct the calculated flow velocity or the calculated flow rate of the fluid with the concentration information.

5. The fluid measurement device according to claim 1, wherein N is 2, 3, or 4.

6. A method of measuring a fluid containing a scatterer using a fluid measurement device, the fluid measurement device comprising first to 2Nth sensor elements, wherein N is an integer of 2 or more, arranged around a pipe in which the fluid containing the scatterer flows, each of the first to 2Nth sensor elements comprising a light source, a light receiver, and a partition structure, wherein the light source and the light receiver in each of the first to 2Nth sensor elements are arranged in proximity along a pipe axis direction of the pipe, each of the light sources and the light receivers of the first to 2Nth sensor elements having a reverse positional relationship to the light sources and the light receivers of adjacent sensor elements of the first to 2Nth sensor elements, and wherein the first to 2Nth sensor elements are arranged on a plane perpendicular to a pipe axis of the pipe at generally equal angular intervals, the method comprising:

irradiating the fluid flowing in the pipe with coherent light, the coherent light being emitted from the light source of a first sensor element of the first to 2Nth sensor elements;

receiving and photoelectrically converting the coherent light by the light receiver of a second sensor element of the first to 2Nth sensor elements, the second sensor element being adjacent to the first sensor element, wherein a distance between the first sensor element and the second sensor element is πd/2 or more and √2r or less, where d is a distance between the light source and the light receiver in the second sensor element and r is an outer radius of the pipe;

performing amplification and filtering of signals obtained from the coherent light received and photoelectrically converted by the light receivers of the first to 2Nth sensor elements; and converting the amplified and filtered signals into digital signals and calculating a flow velocity or a flow rate of the fluid based on the digital signals.

7. The method according to claim 6, further comprising calculating the flow velocity or the flow rate of the fluid based on the coherent light emitted from the light source of the first sensor element, passed through the fluid flowing in the pipe, and received by the light receiver of the second sensor element, and based on scattered light, due to the scatterer, the scattered light being emitted from the light source of the first sensor element and received by the light receiver of the second sensor element.

8. The method according to claim 6, further comprising calculating the flow velocity or the flow rate of the fluid based on an average value of signals received by the light receivers of the first to 2Nth sensor elements.

9. The method according to claim 6, further comprising calculating concentration information on the fluid based on signals of transmitted light detected by the light receivers of the first to 2Nth sensor elements and correcting the calculated flow velocity or the calculated flow rate of the fluid with the concentration information.

10. The method according to claim 6, wherein N is 2, 3, or 4.

* * * * *